United States Patent Office.

CASSIUS C. PECK AND FRANCIS E. ENGELHARDT, OF NEW YORK, N. Y.

*Letters Patent No. 65,425, dated June 4, 1867.*

IMPROVEMENT IN THE MANUFACTURE OF DUROGEL.

*The Schedule referred to in these Letters Patent and making part of the same.*

TO ALL WHOM IT MAY CONCERN:

Be it known that we, CASSIUS CARROLL PECK and FRANCIS ERNST ENGELHARDT, both of the city, county, and State of New York, have invented a new and improved Composition; and we do hereby declare that the following is a full, clear, and exact description thereof, which will enable others skilled in the art to make and use the same.

This invention relates to certain improvements on the composition for durogel, for which Henry Wurtz, of the city of New York, has applied for Letters Patent.

The improvement consists in adding, to a strong solution of common glue or gelatine, chloride of lime, or in its place acids, such as sulphuric or sulphurous acid, or any other mineral acid, and bichromate of potassium or any other alkaline bichromate, to which composition a strong solution of pentasulphide of calcium or other sulphide is added.

We have, in experimenting, found that the aforesaid Wurtz's composition does not fully answer all the purposes for which it is designed, and especially that it is not insoluble in water. By the addition of the mineral acids and the pentasulphide of calcium to his composition, the article does not only become insoluble in cold or warm water, but it dries much quicker and can receive a very fine polish. The composition may be adapted to all purposes for which ivory is used, such as knife-handles, buttons, billiard-balls, &c., &c.

For various purposes the proportions in which the various ingredients are mixed may be varied. We use the same in about the following proportions: To two ounces of gelatine, viz, three to four grains of sulphuric or sulphurous acid, seven to eight grains of bichromate of potash, one-half to two ounces of pentasulphide of calcium. The pentasulphide of calcium is added to the glue, the acid is then added to the solution, and lastly the bichromate of potash. When the glue is mixed with the chloride of lime alone, it is used in the proportion of from five to thirty grains of the latter to two ounces of the former substance. Various ingredients may be added for increasing the weight, for giving different shades or coloring, &c., &c. An addition of carbonate of oxide of lime or phosphate of lime will greatly increase the toughness.

Having thus described our invention, what we claim as new, and desire to secure by Letters Patent, is—

1. The use of bichromate of potassa with the addition of mineral acids, such as sulphuric or sulphurous acid, and in combination with pentasulphide of calcium, or their respective equivalents, substantially as and for the purpose herein set forth.

2. The use of chloride of lime in addition and combination with common glue, substantially as set forth.

The above specification of our invention signed by us this 8th day of December, 1866.

CASSIUS C. PECK,
              FRANCIS E. ENGELHARDT.

Witnesses:
  WM. F. McNAMARA,
  ALEX. F. ROBERTS.